(12) United States Patent
Sugiura et al.

(10) Patent No.: US 8,083,943 B2
(45) Date of Patent: Dec. 27, 2011

(54) FILTRATION DEVICE

(75) Inventors: Kiyotaka Sugiura, Nagoya (JP); Kohji Hattori, Hashima-Gun (JP); Hiroyuki Oyachi, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 481 days.

(21) Appl. No.: 11/956,659

(22) Filed: Dec. 14, 2007

(65) Prior Publication Data

US 2008/0110818 A1    May 15, 2008

Related U.S. Application Data

(63) Continuation of application No. PCT/JP2005/012112, filed on Jun. 30, 2005.

(51) Int. Cl.
 *B01D 29/62* (2006.01)
 *B01D 29/66* (2006.01)
 *B01D 35/16* (2006.01)

(52) U.S. Cl. ............... 210/333.01; 210/108; 210/253; 210/321.8; 210/321.89; 210/321.88; 210/323.1; 210/340

(58) Field of Classification Search .......... 210/253, 210/333.01, 340, 321.8, 321.89, 323.1, 108, 210/275
See application file for complete search history.

(56) References Cited

U.S. PATENT DOCUMENTS

| 5,405,528 A | * | 4/1995 | Selbie et al. ................ 210/232 |
| 5,855,781 A | * | 1/1999 | Yorita et al. ............ 210/321.82 |

FOREIGN PATENT DOCUMENTS

| EP | 0 923 983 A1 | 6/1999 |
| JP | 04-103992 A1 | 4/1992 |
| JP | 05-508801 A1 | 12/1993 |
| JP | 07-117787 A1 | 5/1995 |
| JP | 10-277372 A1 | 10/1998 |
| JP | 11-169679 A1 | 6/1999 |
| JP | 2001-179060 A1 | 7/2001 |
| JP | 2002-333154 A1 | 11/2002 |
| JP | 2003-334429 A1 | 11/2003 |

* cited by examiner

*Primary Examiner* — Benjamin Kurtz
(74) *Attorney, Agent, or Firm* — Burr & Brown

(57) ABSTRACT

A filtration device is provided having a large number of filters, each comprising a filter element and a casing. The device includes filter strings constructed so that a plurality of filters are connected in a row by header tubes, at least two rows of filter strings are further connected in parallel by a filtrate recovery collecting tube, and the filtrate recovery collecting tube is placed at a higher position than the filtrate recovery header tubes.

6 Claims, 11 Drawing Sheets

FILTRATION DEVICE

TECHNICAL FIELD

The present invention relates to a filtration device used for removing suspended materials or harmful materials such as pathogenic microorganisms in liquid, and, more particularly, to a filtration device provided with a large number of filters each comprising a filter element contained in a casing and having a construction in which the filters are connected with each other by piping.

BACKGROUND ART

Recently, the problems of pathogenic microorganisms such as Cryptosporidium and O-157 in addition to the worldwide shortage of water become more serious, and there is demanded a water purification process which can simply produce water high in safety and quality. The microfiltration (MF) and ultrafiltration (UF) using filter elements comprising a filter medium of porous body have been noticed as water purification processes which can effectively remove suspended materials and harmful materials such as pathogenic microorganisms in liquid by a simple operation. As the filter elements used for microfiltration or ultrafiltration, there are generally used those which have partition walls comprising a porous body such as resin or ceramics to form cells as flow paths of liquid.

For example, a filter of hollow fiber membranes is a filter element comprising a large number of hollow fibers as filter media and has capillary partition walls comprising a porous resin, which form cells piercing through the central portion. In this structure, when a liquid to be treated (unfiltered liquid) is supplied to the outside of the hollow fibers under a given pressure, the liquid permeates through the partition walls comprising a porous resin and flows into the cells piercing through the central portion of the hollow fibers. In this case, suspended materials and harmful materials such as pathogenic microorganisms in liquid are removed through the partition walls, and the liquid flowing into the cells can be recovered as a treated liquid (filtrate). That is, in the filter of hollow fiber membrane, the cells formed by partition walls are utilized as flow paths through which filtrate is flowed.

The monolithic filter 2 shown in FIG. 1 is a filter element in which a ceramic porous body is used as a filter medium and a large number of cells 3 are formed so that the directions of flow paths for liquid are in parallel. This filter element has a honeycomb structure which has lattice-like partition walls comprising a ceramic porous body, and a large number of cells 3 defined by the partition walls. In this structure, when a liquid to be treated (unfiltered liquid) is supplied to the inside of cells 3 under a given pressure, the liquid permeates through the partition walls comprising a ceramic body and flows out of the cells. In this case, suspended materials and harmful materials such as pathogenic microorganisms are removed through the partition walls, and the liquid which flows out of the cells, namely, out of the monolith, can be recovered as a treated purified liquid (filtrate). That is, in the monolithic filter 2 shown in FIG. 1, cells 3 formed by the partition walls are utilized as flow paths through which unfiltered liquid is allowed to flow.

When the above filter element is used for microfiltration or ultrafiltration, in many cases, it is used in the form of a filter comprising the filter element is contained in a casing. All of the above-mentioned filter elements have a structure where the flow paths for unfiltered liquid and the flow paths for filtrate are divided by the partition walls, though there is a difference whether the cells are used as flow paths for filtrate or as flow paths for unfiltered liquid. Therefore, it becomes possible to separate and recover only the filtrate by containing the filter element in a casing, and the flow paths for unfiltered liquid and the flow paths for filtrate are liquid tightly isolated with a sealing material such as O-ring. Generally, in such a filter the filter element is contained in the casing so that the liquid is allowed to flow in vertical direction.

The above filter singly has a filtrating function, but in order to increase filtration area, namely, increase water permeation amount per unit time and unit filtration area (hereinafter referred to as merely "water permeation amount") and improve filtering ability in a large-scale plant such as water purification plant or factory which is required to treat a large amount of unfiltered liquid, the filter is generally used as a filtration device having a structure where a large number of the filters are connected with each other by piping. For example, there is known a filtration device having a structure where a large number of filters are connected by header tubes (e.g., Patent Document 1).

Patent Document 1: JP-A-2003-334429

However, the above filtration device having a structure where a large number of filters are connected by header tubes is useful for increase of filtration area and improvement of treating ability, but has the problem that a sufficient washing effect cannot be obtained at the time of back washing.

When filtration is continuously carried out with the above-mentioned filter, suspended materials and the like which are filtered off are gradually deposited on the surface of the partition walls of the filter element, and hence the water permeability gradually lowers. Therefore, washing operation called "back washing" which comprises passing under pressure a clarified water or washing liquid chemical in opposite direction to filtration direction (namely, toward the side of unfiltered liquid flow paths from the side of filtrate flow paths) is carried out periodically or non-periodically. By this back washing, suspended materials and the like deposited on the surface of the partition walls of the filter element can be separated and removed, and the water permeability can be recovered to nearly the initial level.

However, in the case of the above filtration device, it is difficult to uniformly apply the back washing pressure to a large number of the filters which constitute the filtration device due to the device structure where a large number of filters are connected by header tubes, and there is the possibility of washing effect in respective filters being non-uniform. Similarly, in one filter, it is also difficult to uniformly apply the back washing pressure to a large number of cells formed in the filter element, and sometimes there are variations in the washing effect in respective cells.

Under the circumstances, since back washing effect is apt to be insufficient, the above filtration device are not preferred because of various problems that (i) the filtration area which the filter element inherently has cannot be effectively utilized and the water permeability decreases than design value and (ii) even if the back washing is once carried out, the water permeability decreases again in a short time and the back washing must be frequently carried out.

SUMMARY OF THE INVENTION

As explained above, at present, a filtration device which has a structure of a large number of filters being connected by header tubes and which can give sufficient washing effect at the time of back washing of the filters has not yet been disclosed, and it is in great demand in industry to provide such filtration device. The present invention has been made to solve the above problems in conventional technology, and provides a filtration device in which a back washing pressure can be uniformly applied to a large number of filters or to a large number of cells formed in the filter element, and by which a sufficient washing effect can be obtained at the time of back washing of the filters, and which exhibits more advantageous effects as compared with conventional filtration devices.

As a result of intensive research conducted by the inventors in an attempt to solve the above problems, it has been found that in a filtration device having a structure of a large number of filters being connected by header tubes, air is apt to remain inside the header tubes, and air reservoirs formed by the air reduces the back washing pressure, and as a result, a sufficient washing effect cannot be obtained at the back washing of the filters. The inventors have conceived that the above problems can be solved by employing such a novel construction that filter strings are constructed by connecting a plurality of filters in a row by header tubes, at least two rows of the filter strings are further connected in parallel by a collecting tube, and besides the collecting tube is placed at a higher position than the header tubes. Thus, the present invention has been accomplished. That is, the present invention provides the following filtration device.

According to a first aspect of the present invention, filtration device is provided which has a large number of filters each composed of a filter element having a partition wall comprising a porous body and having cells as flow paths of liquid formed by the partition wall and a casing capable of containing the filter element. The filter element is contained in the casing so that it allows the liquid to flow in a vertical direction. The casing has an unfiltered liquid feed opening which can feed liquid to be filtered (unfiltered liquid) to the filter element, a filtrate delivery opening which can deliver the filtered liquid (filtrate) from the filter element, and an unfiltered liquid discharge opening which can discharge the unfiltered liquid from the filter element. As piping to connect a large number of the filters to each other, there are provided unfiltered liquid feeding header tubes having a plurality of openings capable of being connected to the unfiltered liquid feeding opening of the casing, filtrate recovery header tubes having a plurality of openings capable of being connected to the filtrate delivery opening of the casing, unfiltered liquid recovery header tubes having a plurality of openings capable of being connected to the unfiltered liquid discharge opening of the casing, and filtrate recovery collecting tubes having at least two openings capable of being connected to the filtrate recovery header tubes. Filter strings are constructed from a plurality of the filters connected in a row by the unfiltered liquid feeding header tubes, the filtrate recovery header tubes and the unfiltered liquid recovery header tubes, at least two rows of the filter strings are further connected in parallel by the filtrate recovery collecting tube, and the filtrate recovery collecting tube is placed at a higher position than the filtrate recovery header tubes.

According to a second aspect of the present invention, a filtration device is provided which has a large number of filters each composed of a filter element having a partition wall comprising a porous body and having cells as flow paths of liquid formed by the partition wall and a casing capable of containing the filter element. The filter element is contained in the casing so that it allows the liquid to flow in a vertical direction. The casing has an unfiltered liquid feed opening which can feed liquid to be filtered (unfiltered liquid) to the filter element, a filtrate delivery opening which can deliver the filtered liquid (filtrate) from the filter element, and an unfiltered liquid discharge opening which can discharge the unfiltered liquid from the filter element. As piping to connect the filters to each other, there are provided unfiltered liquid feeding header tubes having a plurality of openings capable of being connected to the unfiltered liquid feeding opening of the casing, filtrate recovery header tubes having a plurality of openings capable of being connected to the filtrate delivery opening of the casing, unfiltered liquid recovery header tubes having a plurality of openings capable of being connected to the unfiltered liquid discharge opening of the casing, and filtrate recovery collecting tubes having at least two openings capable of being connected to the filtrate recovery header tubes. Filter strings are constructed from a plurality of the filters connected in a row by the unfiltered liquid feeding header tubes, the filtrate recovery header tubes and the unfiltered liquid recovery header tubes. At least two rows of the filter strings are further connected in parallel by the unfiltered liquid recovery collecting tube, and the unfiltered liquid recovery collecting tube is placed at a higher position than the unfiltered liquid recovery header tubes.

According to a third aspect of the present invention, a filtration device according to the first aspect is provided, wherein as the piping, there is further provided unfiltered liquid recovery collecting tubes having at least two openings capable of being connected to the unfiltered liquid recovery header tubes, and wherein the unfiltered liquid recovery collecting tubes are placed at a higher position than the unfiltered liquid recovery header tubes.

According to a fourth aspect of the present invention, a filtration device according to any one of the above first through third aspects is provided, wherein the filter element is a monolithic filter element comprising a ceramic porous body and having a large number of cells formed so that the flow path directions of liquid are in parallel.

According to a fifth aspect of the present invention, a filtration device according to any one of the above first through fourth aspects is provided, wherein the filtrate recovery collecting tubes and/or the unfiltered liquid recovery collecting tubes are provided with a drain valve for removal of air.

The filtration device of the present invention exhibits advantageous effects as compared with conventional devices, namely, back washing pressure can be uniformly applied to a large number of cells formed in a large number of filters or filter elements, and a sufficient back washing effect can be obtained at the time of back washing of the filters.

BRIEF DESCRIPTION OF THE DRAWINGS

FIG. 11 is an explanatory diagram which schematically shows one embodiment of a seal cap, where

FIG. 12 is an explanatory diagram which schematically shows state of using of the seal cap, where

DESCRIPTION OF REFERENCE NUMERALS USED IN THE DRAWINGS

2: monolithic filter; 3: cell; 4: monolith; 5: water collective slit; 6: sealing member; 10, 50: filtration device; 12, 52: filter; 14: filter element; 16: casing; 18, 58: header tube; 20, 60: unfiltered liquid feeding header tube; 22, 62: filtrate recovery header tube; 24, 64: unfiltered liquid discharging header tube; 65: L-type piping; 26, 28, 30, 32, 34, 38: valve; 36, 76: unfiltered liquid drain piping; 40, 80: filtrate drain piping; 74, 78: drain valve; 82: filter string; 84: filtrate recovery collecting tube; 86: unfiltered liquid recovery collecting tube; 100: filter; 102: casing; 104: filter element; 104a: outer peripheral surface; 106: unfiltered liquid feed opening; 108: filtrate delivery opening; 110: unfiltered liquid discharging opening; 112: casing body; 112a: inner peripheral surface; 114: upper cap; 116: bottom cap; 118, 120: O-ring; 122, 124: seal cap; 122a: top portion; 122b: trunk part; 122c: central opening; and 126: space.

DETAILED DESCRIPTION OF THE INVENTION

The best mode for operating the filtration device of the present invention will be specifically explained below, which should not be construed as limiting the invention.

In developing the filtration device of the present invention, the inventors have firstly investigated the reasons why the sufficient washing effect cannot be obtained in back washing in the conventional filtration devices. Specific explanation will be made using the drawings on a filtration device containing a monolithic filter made of ceramics as a filter element.

FIG. 2-FIG. 6 are schematic views of filtration device 10 having such a structure as a large number of filters 12 being connected by header tubes 18. Such filtration device 10 is used at an operation cycle of water filling operation, filtration operation, and back washing operation.

Figure 2:
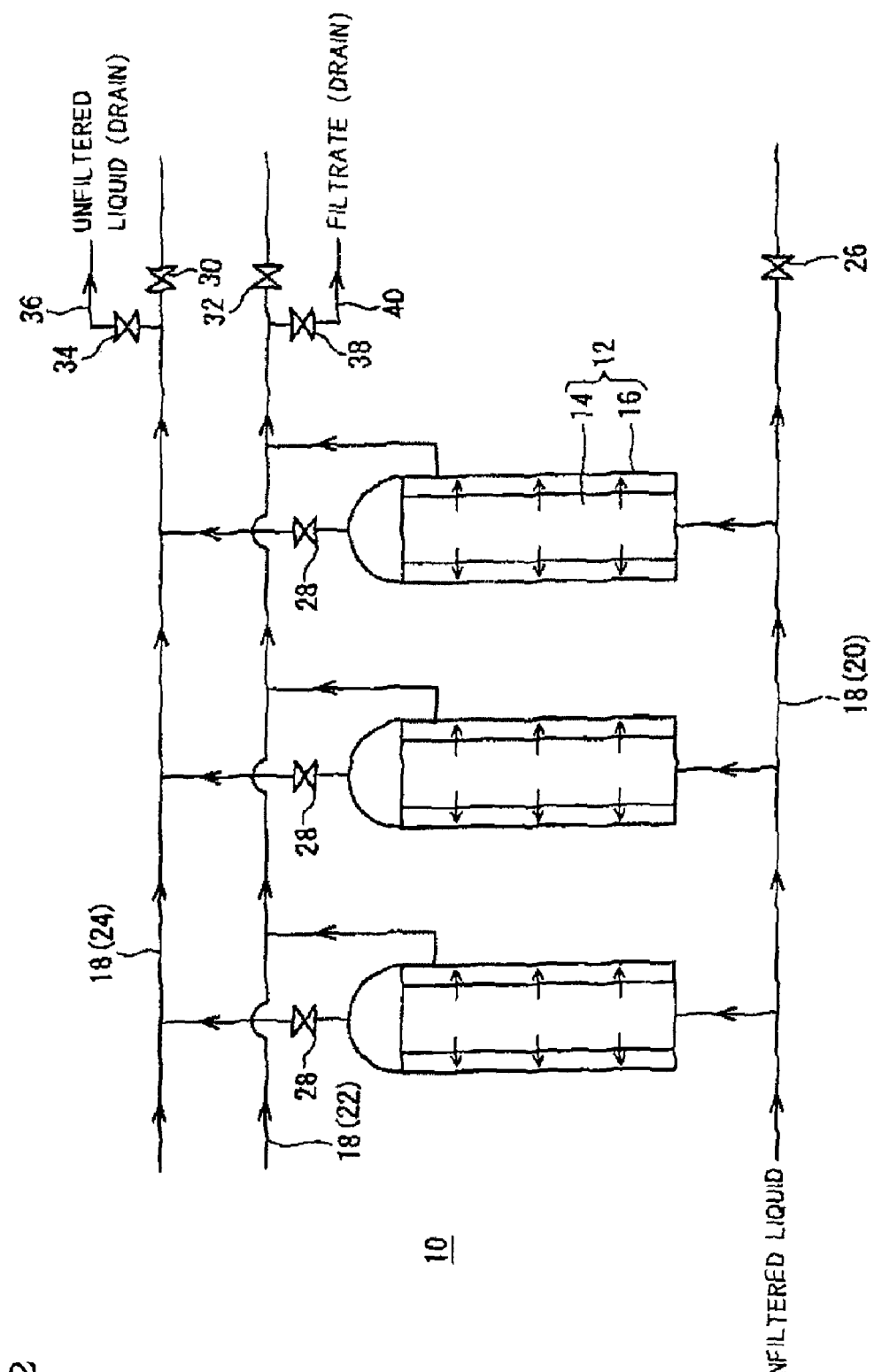
FIG. 2 is a block diagram which schematically shows an operation method (water filling operation) of the filtration device.

The water filling operation is an operation carried out for replacing with an unfiltered liquid or filtrate the air present in filters 12 (filter element 14 and casing 16) and in header tubes 18 to discharge the air out of the system prior to carrying out the filtration operation. At the time of water filling operation, as shown in FIG. 2, the unfiltered liquid is distributed and fed to a plurality of filters 12 from unfiltered liquid feeding header tube 20 in the state of valves 28, 34, 38 being opened and valves 26, 30, 32 being closed. By this operation, the unfiltered liquid is collected in unfiltered liquid discharging header tube 24 through the unfiltered liquid flow path of filter elements 14, and discharged to unfiltered liquid drain piping 36. The filtrate which has permeated through the partition wall of each filter element 14 is collected in filtrate recovery header tube 22 through the inner space (filtrate flow path) of casing 16 and discharged to filtrate drain piping 40.

Figure 3:
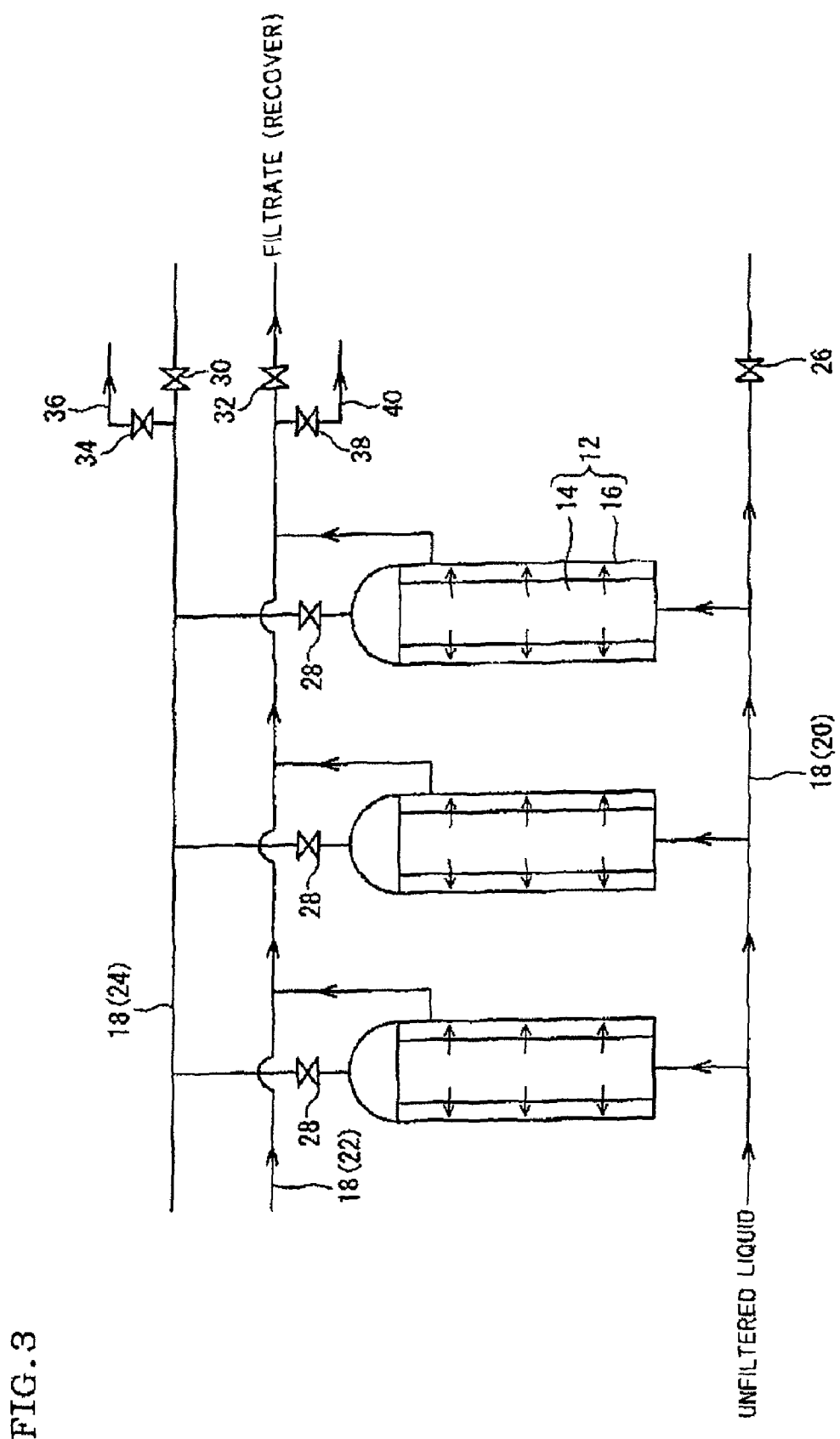
FIG. 3 is a block diagram which schematically shows an operation method (filtration operation) of the filtration device.

At the time of filtration operation, as shown in FIG. 3, the unfiltered liquid is distributed and fed to a plurality of filters 12 from unfiltered liquid feeding header tube 20 in the state of valve 32 being opened and valves 26, 28 being closed. By this operation, the unfiltered liquid is filtered during permeation through the partition wall of filter element 14, and the filtrate is collected in filtrate recovery header tube 22 through the inner space (filtrate flow path) of casing 16 and recovered.

Figure 4:
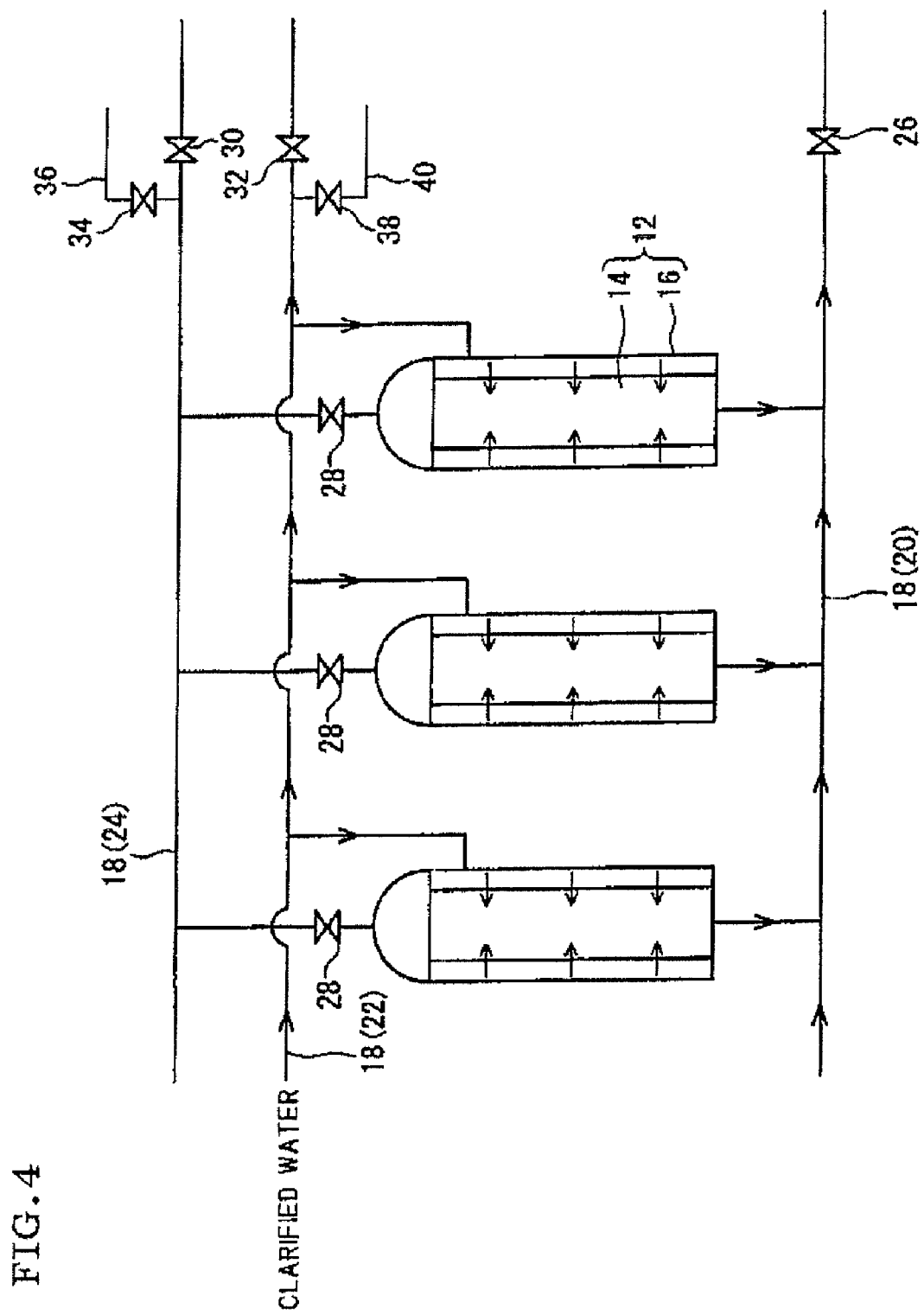
FIG. 4 is a block diagram which schematically shows an operation method (back washing operation) of the filtration device.

In back washing operation, as shown in FIG. 4, first, clarified water for back washing is distributed and fed to a plurality of filters 12 from filtrate recovery header tube 22 in the state of valves 26, 28, 30, 32, 34, and 38 being closed. In this case, the clarified water is fed under a high pressure of, for example, 450 kPa.

Figure 5:
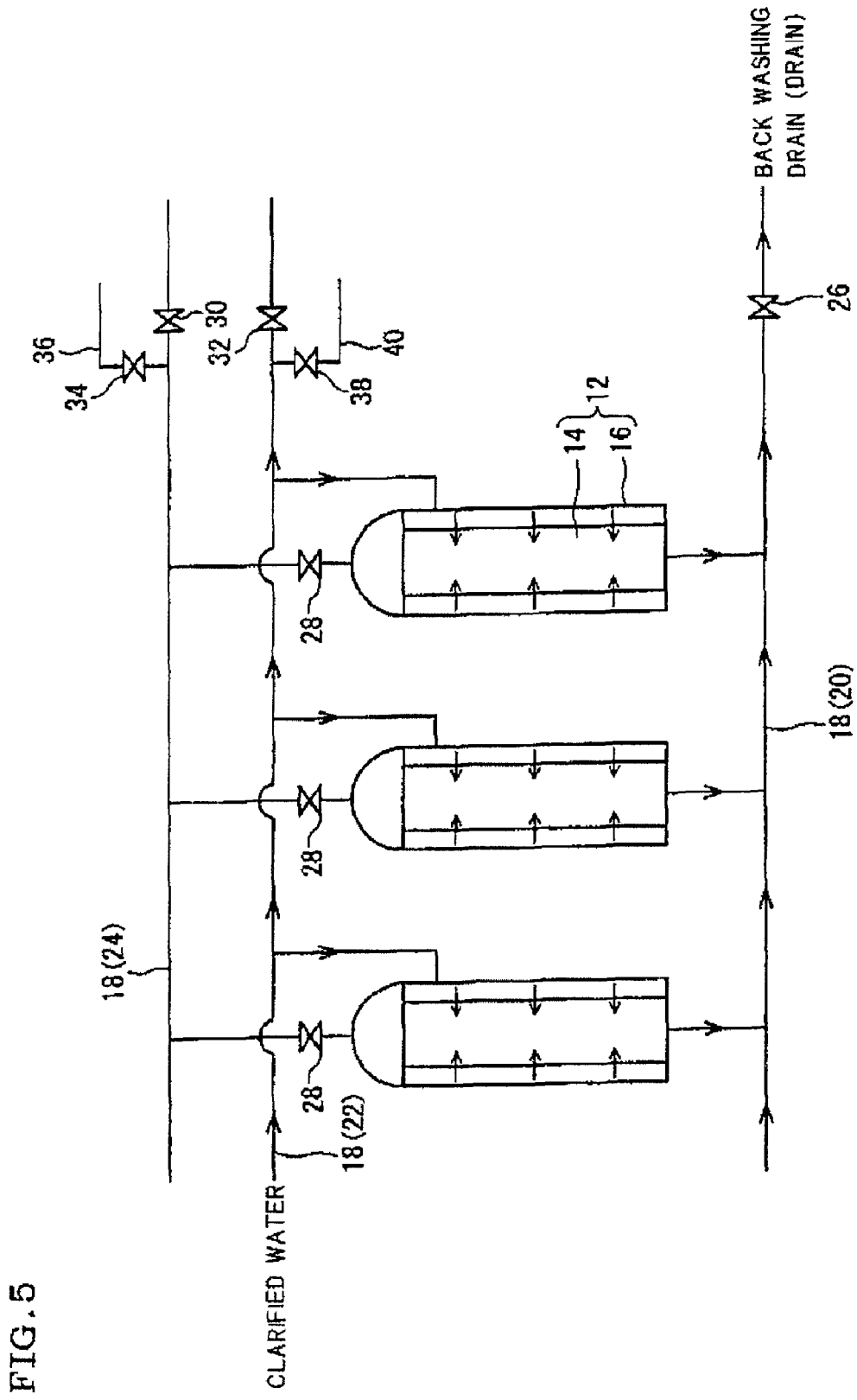
FIG. 5 is a block diagram which schematically shows an operation method (back washing operation) of the filtration device.

Then, as shown in FIG. 5, valve 26 is opened in a moment. By this operation, there occurs difference in pressure between the filtrate flow path side and the unfiltered liquid flow path side of filter element 14, and the clarified water stored in the inner space (filtrate flow path) of casing 16 permeates through the partition wall of filter element 14 and flows into the unfiltered liquid flow path of filter element 14. In this case, the suspended materials or the like deposited on the surface of the partition wall of filter element 14 are separated from the surface of the partition wall, and simultaneously the back washing drain is collected in unfiltered liquid feeding header tube 20 and discharged.

Figure 6:
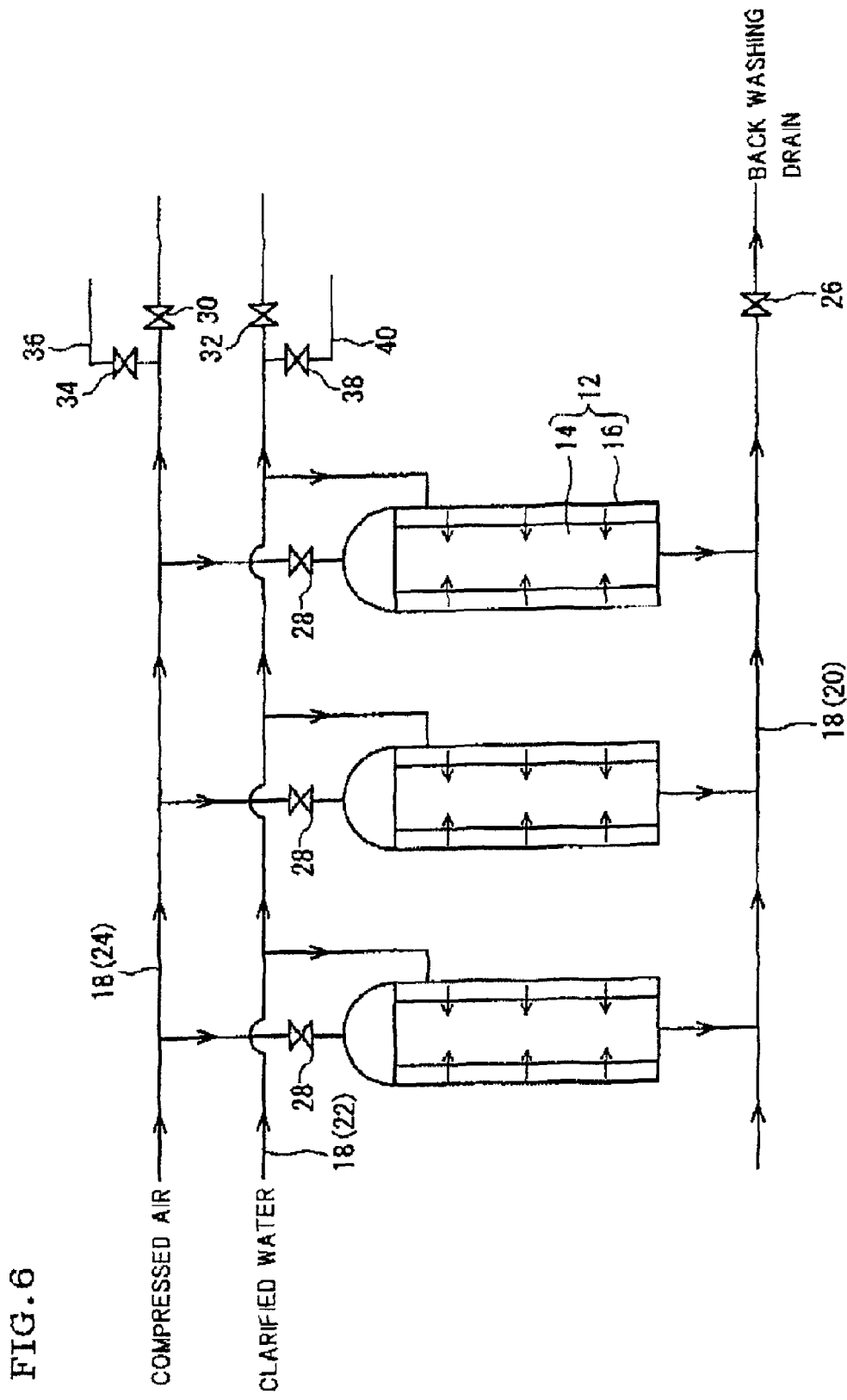
FIG. 6 is a block diagram which schematically shows an operation method (back washing operation) of the filtration device.

Furthermore, as shown in FIG. 6, valve 28 is opened, and compressed air for back washing is distributed and fed to a plurality of filters 12 from unfiltered liquid discharging header tube 24. In this case, the compressed air is fed under a high pressure of, for example, 200 kPa. By this operation, the suspended materials or the like separated from the surface of the partition wall of filter element 14 are carried away at a stretch together with back washing drain and compressed air. This back washing drain is collected in unfiltered liquid feeding header tube 20 through the unfiltered liquid path of filter element 14 and is discharged as a back washing drain.

It has been considered that in the operation cycle as mentioned above, air present in filters 12 or header tubes 18 is discharged out of the system at the water filling operation. However, as a result of detailed investigation conducted by the inventors, it has been found that actually the air present in filters 12 or header tubes 18 can hardly be completely discharged out of the system only by this operation. Specifically, it has been found that it is difficult to completely discharge the inner air in filtrate recovery header tubes 22 and unfiltered liquid discharging header tubes 24 disposed above filters 12, and air is apt to remain.

More specifically, in a filtration device having such a structure as a large number of filters being connected by header tubes, it is difficult in water filling operation to perform filling of liquid by uniformly feeding unfiltered liquid to all of the filters without causing variation in the liquid level of the respective filters (for example, feeding of unfiltered liquid is later for the filters connected to the end side of the unfiltered liquid feeding header tube, and hence the level of liquid in these filters at filling of liquid tends to lower). Therefore, it can be said that a large amount of air remains in the filters to which the unfiltered liquid is fed later than other filters or in the piping near the filters, and retention of air is apt to occur.

Thus, in the conventional filtration devices, many air retentions are present in the header tube. The air retentions decrease the pressure of clarified water or compressed air in back washing and reduces the action, which causes insufficient washing effect in back washing of the filters. Furthermore, the air retentions are present non-uniformily in the header tube, and hence, it becomes difficult to uniformly apply the back washing pressure to a large number of the filters, or a large number of cells formed in the filter element.

Figure 7:
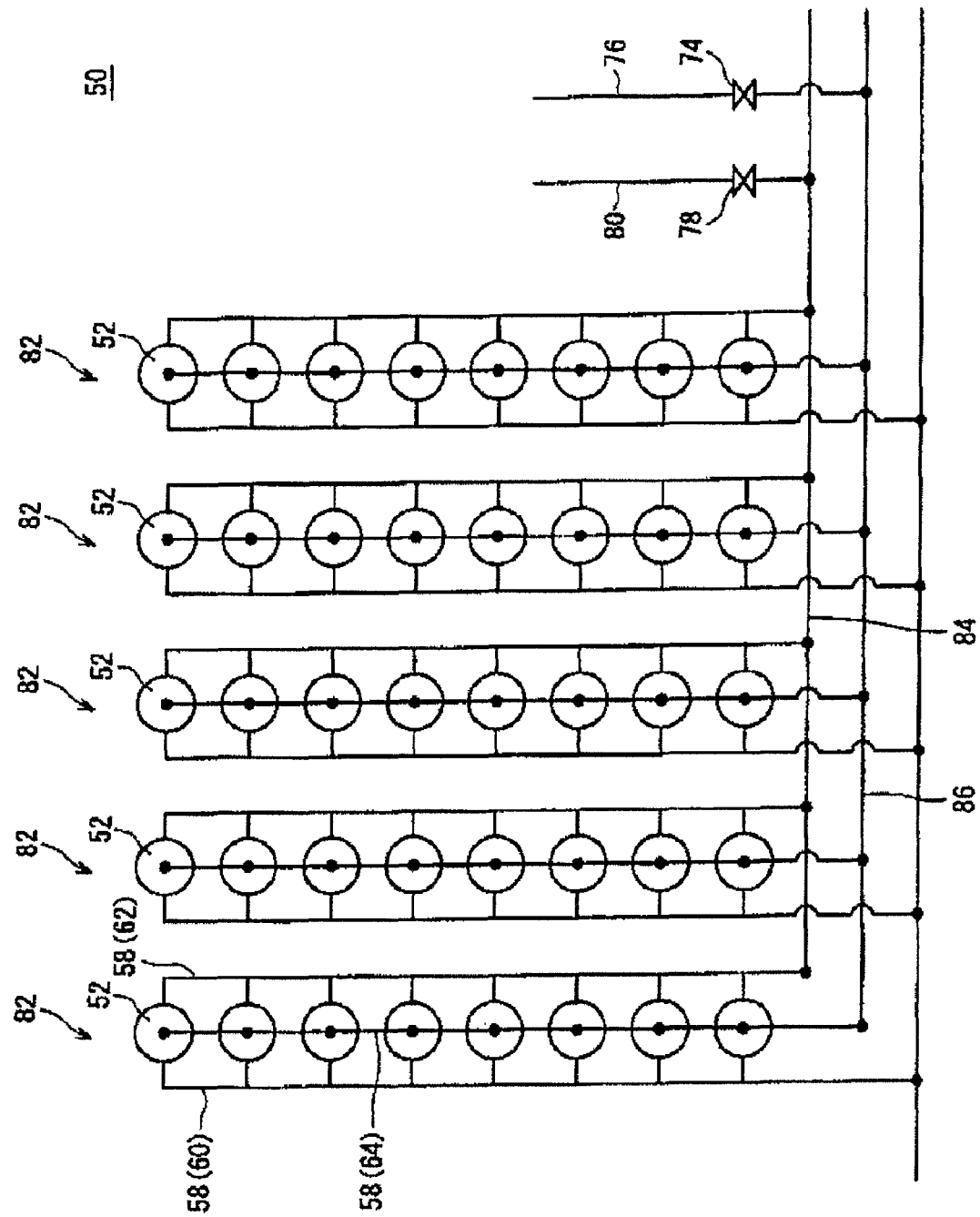
FIG. 7 is a block diagram which shows one embodiment of the filtration device of the present invention.
Figure 8:
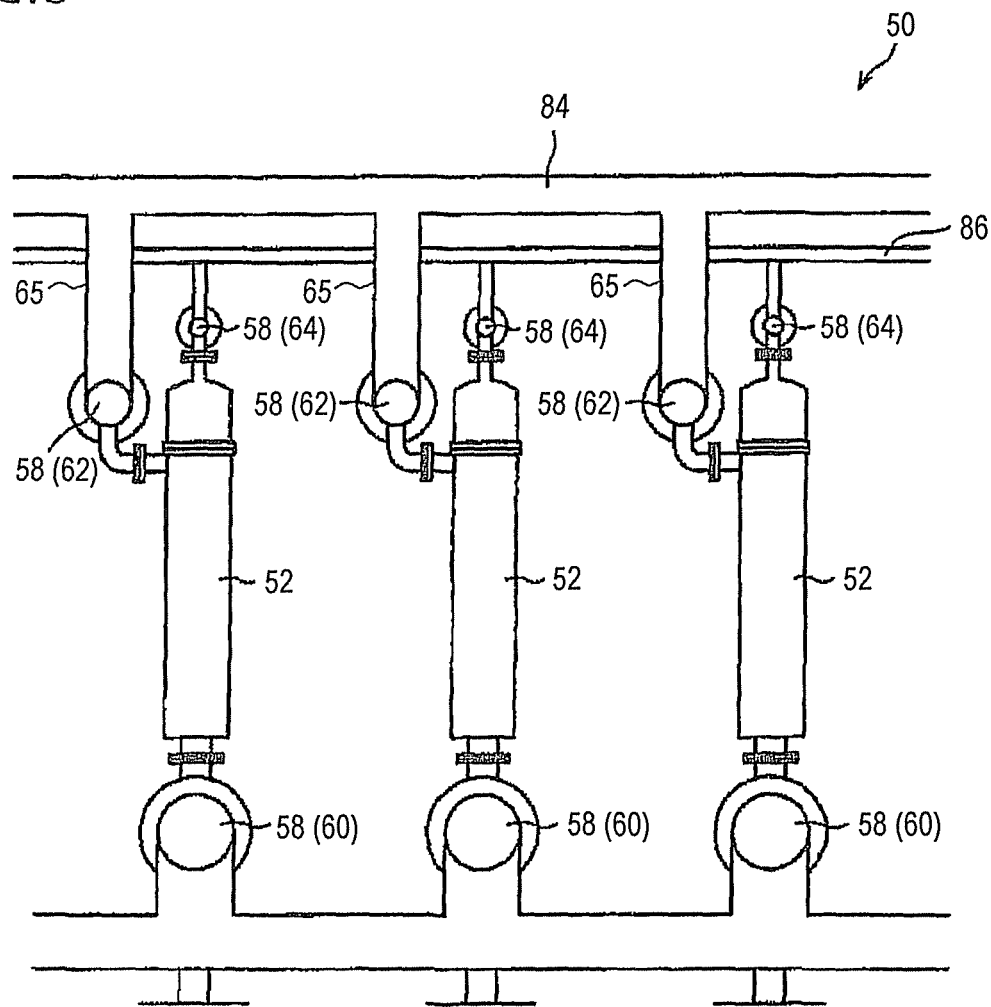
FIG. 8 is a side view which schematically shows one embodiment of the filtration device of the present invention.

Therefore, in the present invention, as shown in FIG. 7 and FIG. 8, filter strings 82 are constructed in such a manner that a plurality of filters 52 are connected in a row by header tubes 58 such as unfiltered liquid feeding header tubes 60, filtrate recovery header tubes 62 and unfiltered liquid recovery header tubes 64, and at least two rows of filter strings 82 are further connected in parallel by a filtrate recovery collecting tube 84, and furthermore the filtrate recovery collecting tube 84 is placed at a higher position than the filtrate recovery header tubes 62. For example, the piping is allowed to rise upward by connecting an L-type piping (elbow) 65 to the filtrate recovery header tubes 62, and filtrate recovery collecting tube 84 is connected to the end of the piping.

Since air has the property of escaping from the lower side to the higher side, according to the above structure, the retained air in the filtrate recovery header tubes 62 can be surely extracted at least up to the filtrate recovery collecting tube 84. That is, the air present in the filtrate recovery header tubes 62 can be nearly completely discharged, and occurrence of various problems caused by the air in the header tubes 58 can be effectively inhibited.

On the other hand, in the case where the filtrate recovery collecting tube is placed horizontal with the filtrate recovery header tube (namely, at the same level of height) or the filtrate recovery collecting tube is placed at a lower position than the filtrate recovery header tube, the inner air cannot be sufficiently replaced with unfiltered liquid or filtrate even by carrying out the water filling operation, and it is difficult to know where the air is retained in the header tubes.

The above effects can be obtained not only in the filtrate recovery header tubes 62, but also in the unfiltered liquid recovery header tube 64. That is, in the present invention, it is also preferred that filter strings 82 are constructed of a plurality of filters 52 connected in a row by header tubes 58 such as unfiltered liquid feeding header tubes 60, filtrate recovery header tubes 62 and unfiltered liquid recovery header tubes 64, and at least two rows of the filter strings 82 are further connected in parallel by an unfiltered liquid recovery collecting tube 86, and furthermore the unfiltered liquid recovery collecting tube 86 is placed at a higher position than the unfiltered liquid recovery header tubes 64.

In the filtration device 50 of the present invention, it is particularly preferred that the filtrate recovery collecting tube 84 is placed at a higher position than the filtrate recovery header tubes 62, and the unfiltered liquid recovery collecting tube 86 is placed at a higher position than the unfiltered liquid recovery header tubes 64. According to such a construction, the inner air can be surely removed from both the filtrate recovery header tubes 62 and the unfiltered liquid recovery header tubes 64.

The filtration device of the present invention can solve such various problems that the filtration area inherently possessed by the filter element cannot be effectively utilized, and even if back washing is carried out once, the water permeability decreases again and the back washing must frequently be repeated. Furthermore, if air is present in the header tubes, the filter element is sometimes damaged when compressed air for back washing is fed, and such damaging can be prevented according to the filtration device of the present invention. Moreover, pressure difference between the side of filtrate flow path of filter element and that of unfiltered liquid flow path of the filter element can be exactly measured, and proper timing of back washing can be set with monitoring the filtration pressure difference.

In the filtration device of the present invention, it can also be considered that air removed from the header tubes remains in the collecting tubes to cause retention of air. However, since in the filtration device of the present invention, the collecting tube is placed at a higher position than the header tubes, the effect of removal of air is high and the air present in the collecting tube is in a very slight amount. Therefore, it can hardly be considered that the air retained in a very slight amount back-flows to the header tubes placed at a lower position than the collecting tube, and even if the air back-flows to the header tubes, the air hardly causes decrease of back washing effect of the filters. In such a filtration device, valves such as butterfly valve are generally provided between the collecting tube and the header tubes, and hence the back-flowing of the air in the collecting tube can be surely inhibited by carrying out back washing in the state of the valve being closed. Thus, being different from the air retention in the header tubes, the air retention in the collecting tube causes substantially no problems.

Furthermore, in the filtration device of the present invention, as shown in FIG. 7, it is preferred that drain valves 74, 78 for air removal which control communication between filtrate recovery collecting tube 84 (or unfiltered liquid recovery collecting tube 86) and unfiltered liquid drain piping 76 (or filtrate drain piping 80) are provided at one or both of filtrate recovery collecting tube 84 and unfiltered liquid recovery collecting tube 86. In such a construction, the number of valves can be reduced as compared with the structure where drain valves for removal of air are provided at each filter 52 or each filter string 82, and hence the troublesome air removal operation can be performed by one air removing valve. Therefore, the filtration device is particularly suitable as a large-sized filtration device (e.g., a filtration device having 100 filters in total comprising 10 rows of filter strings in which 10 filters are connected) which is used in large-scale plants such as water purification plants and factories. According to such a construction, the device can be simplified and plant cost can be reduced.

The filtration device of the present invention explained above comprises a large number of filters and piping which connects them with each other. Specific embodiments of the respective constituting elements will be shown below.

(1) Filter:

The "filter" in the present invention is composed of a filter element and a casing.

(i) Filter Element:

The "filter element" in the present specification means a filter element which has a partition wall comprising a porous body and cells as flow paths of liquid formed by the partition wall. According to such a filter element, when an unfiltered liquid permeates through the partition wall and flows into the cells or the unfiltered liquid permeates through the partition wall and flows out of the cells, suspended materials or harmful materials such as pathogenic microorganisms are removed at the partition wall, and the liquid which flows into the cells or the liquid which flows out of the cells can be recovered as a purified filtered liquid (filtrate).

The material constituting the filter element is not particularly limited, and filter elements comprising resins or ceramics are generally used.

As the resins constituting the filter elements, there are used, for example, polypropylene (PP), polyethylene (PE), polyacrylonitrile (PAN), cellulose acetate (CA), polysulfone (PS), polyether sulfone (PES), polyvinylidene fluoride (PVDF), etc. Of these resins, polyvinylidene fluoride is suitable because it is high in endurance against cleaning chemicals such as hydrogen peroxide and hypochlorous acid.

The ceramics constituting the filter elements include, for example, alumina ($Al_2O_3$), titania ($TiO_2$), mullite ($Al_2O_3SiO_2$), zirconia ($ZrO_2$), etc. Among them, alumina is suitable because starting materials controlled in particle diameter are easily available, a stable slurry can be formed, and it is high in corrosion resistance. Ceramics have various advantages that they are high in reliability because of their superior mechanical strength and endurance, less in deterioration in chemical cleaning such as acid cleaning or alkali cleaning because of their high corrosion resistance, and furthermore they can be precisely controlled in average pore diameter which determines filtration ability. Therefore, it can be said that ceramics are preferred than resins as materials constituting the filter elements.

As the filter elements made of resins, mention may be made of filters of hollow fiber membranes explained hereinbefore as a representative example. The filter of hollow fiber membranes is a filter element having a structure comprising a large number of hollow fibers as filter media and having capillary partition wall comprising a porous resin, which forms cells piercing through the central portion. Such filters of hollow fiber membranes are mostly columnar as a whole.

As the filter elements made of ceramics, mention may be made of tube-like filters or monolithic filters explained hereinbefore as a representative example. The tube-like filters have a structure which have a cylindrical partition wall comprising ceramic porous body and in which a single cell which pierces through the central part and is divided by the partition wall is formed. On the other hand, the monolithic filters have a honeycomb structure which has a lattice-like partition wall comprising a ceramic porous body and in which a large number of cells divided by the partition wall are formed. Among them, the monolithic filters are suitable because they have a large filtration area per unit volume and are high in filtration ability.

As the tube-like filters or monolithic filters, suitable are those which comprise a substrate having a partition wall comprising a ceramic porous material and cells as liquid flow paths formed by the partition wall and a filtration membrane which is formed on the surface of the partition wall (namely, inner peripheral surface of the cells) and comprises a ceramic porous body with an average pore diameter smaller than that of the substrate.

In the case of the above structure, the filtration function is exhibited solely by the filtration membrane, and hence the average pore diameter can be made greater. Therefore, the flow resistance occurring when the liquid which permeates through the partition wall and flows out of the cells permeates through the inside of the substrate can be reduced, and the water permeation amount can be increased.

The average pore diameter of ceramic porous body constituting the filtration membrane which may vary depending on the required filtration performance (particle diameter of materials to be removed) is about 0.01-1.0 μm in the case of filter elements used for microfiltration or ultrafiltration. On the other hand, the average pore diameter of the ceramic porous body constituting the substrate is determined considering the balance between mechanical strength and water permeation amount. Usually, a ceramic porous body having about 1 μm to several hundred μm is used as the substrate.

The substrate can be obtained, for example, by a method of molding a pottery clay containing aggregate particles, followed by drying and firing, and the filtration membrane can be formed, for example, by a method of forming a membrane from a slurry containing aggregate particles on the surface of partition wall of the substrate, followed by drying and firing. The membrane formation can be performed by known membrane forming methods such as dip method, and preferred is a filtration method (JP-B-63-66566) capable of effectively inhibiting formation of membrane defects such as pin holes.

Generally, the average pore diameter of the substrate or filtration membrane is controlled by the average particle diameter of aggregate particles constituting them. That is, when aggregate particles having a greater average particle diameter are used, a substrate or filtration membrane of greater average pore diameter can be formed, and when aggregate particles having a smaller average particle diameter are used, a substrate or filtration membrane of smaller average pore diameter can be formed.

It is also one preferred embodiment that between the substrate and the filtration membrane, there is formed at least one intermediate membrane comprising a ceramic porous body having an average pore diameter which is intermediate of the average pore diameter of the substrate and that of the filtration membrane. If it is attempted to form a filtration membrane from a slurry containing aggregate particles having a small average particle diameter on the surface of partition wall of substrate having a great average pore diameter, the aggregate particles in the slurry enter into the pores of the substrate to clog the pores, which may cause decrease of water permeation amount. In the case of the structure mentioned above, the aggregate particles in the slurry for forming the filtration membrane can be trapped on the surface of the intermediate membrane, and hence the aggregate particles can be prevented from entering into the pores of the substrate, which is preferred.

Furthermore, as the monolithic filter comprising a substrate and a filtration membrane as mentioned above, there may be suitably used a filter in which at least the end face (the portion other than the cell openings) of the monolith is coated with a film comprising a water impermeable material such as glass (e.g., JP-A-61-8106 and JP-A-2001-300273).

Since a filtration membrane is usually not formed on the end face of the monolith and the substrate of large average pore diameter is exposed, the unfiltered liquid which enters into the substrate from the end face of the substrate sometimes incorporates into the filtrate which has already permeates through the filtration membrane, and flows into the substrate. In the case of the above structure, the unfiltered liquid can be prevented from incorporating into the filtrate and the filtrate can be prevented from contamination.

Figure 9:
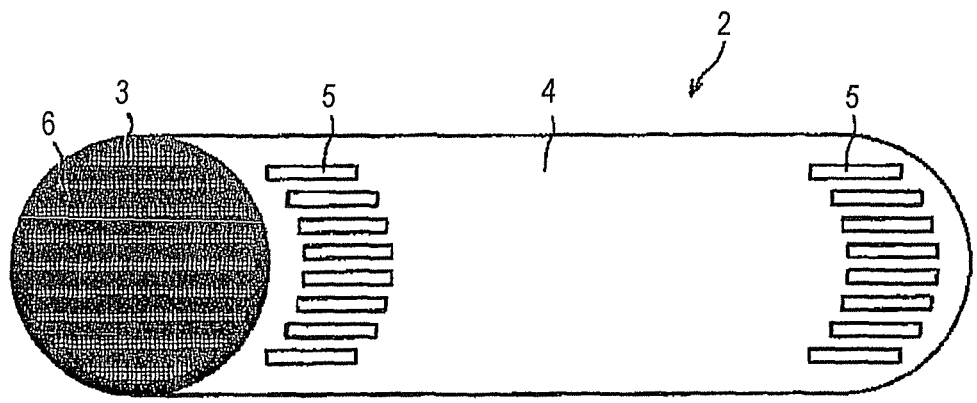
FIG. 9 is an oblique view which shows another embodiment of the filter element.

Furthermore, as the monolithic filter, there may be suitably used, for example, a monolithic filter 2 as shown in FIG. 9 in which a large number of cells 3 are formed, and additionally water collecting slits 5 which allow a group of cells disposed in parallel to communicate with the external space of monolith 4 are formed in a part of longer direction, and openings of both ends of the cells (water collecting cells) communicating with the water collecting slits 5 are sealed up by a sealing member 6.

In the monolithic filter, the cells near the central part are higher in flow resistance when the filtrate flows out of the monolith. Therefore, only the cells near the outer peripheral part which are low in flow resistance when the filtrate flows out of the monolith are used for filtration, and substantial filtration area, namely, water permeation amount, may decrease. According to the above structure, the filtrate which flows out of the cells near the central part can be allowed to rapidly flow into the external space of the monolith via water collecting slits. Therefore, the cells near the central part can also be effectively utilized, and substantial filtration area, namely, water permeation amount, can be greatly increased. Such structure is particularly effective in the case of a large monolithic filter (e.g., outer diameter: 180 mmϕ) having a large distance between the cells near the central part and the outer periphery of the monolith. For the water collecting cells, the both openings of the cells are sealed, and hence the unfiltered liquid never incorporates from the openings of the cells.

The water collecting slits can be formed by breaking a group of cells disposed in a row in such a manner that they communicate with the external space of the monolith. Breakage of cells may be carried out for molded body or dried body before firing or for sintered body after firing. The sealing of cell openings can be carried out, for example, by a method of filling a pottery clay (sealing material) comprising the same material as the monolith in the opening portions, then drying and firing. As shown in FIG. 9, in many cases, a plurality of water collecting slits 5 are formed near the both end faces of monolith 4, respectively. Generally, the water collecting slits are formed in parallel with each other.

Figure 1:
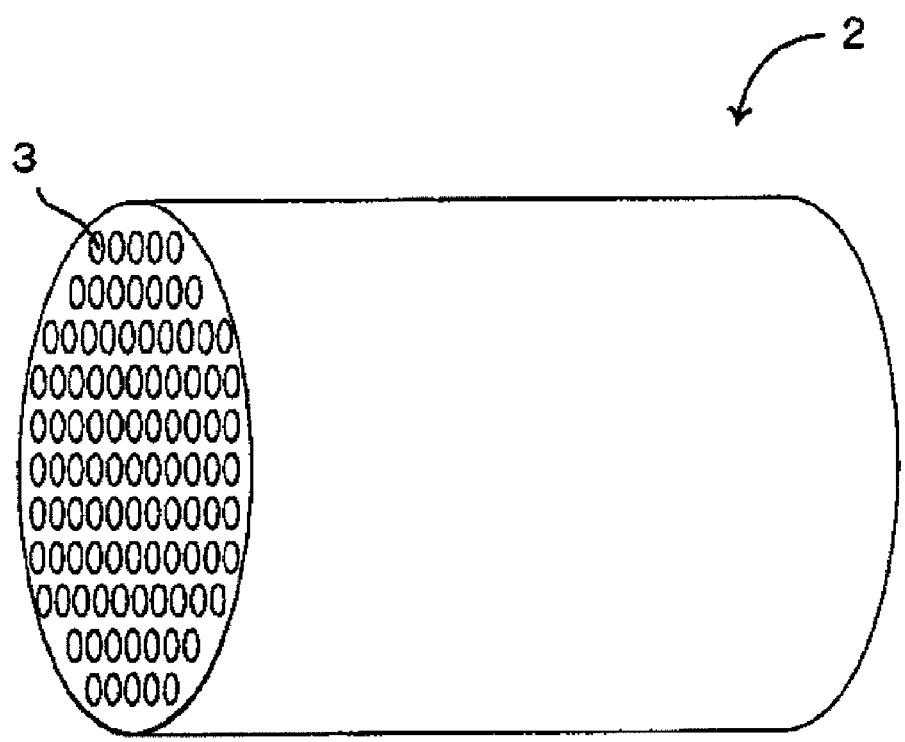
FIG. 1 is an oblique view which schematically shows one embodiment of filter elements.

The shape of the tube-like filter or monolithic filter is not particularly limited so long as the filtering function is not hindered. As for the shape on the whole, mention may be made of columnar shape as shown in FIG. 1, and besides square pillar shape, triangular pillar shape, etc. may be mentioned. Among them, columnar shape is suitable because the filter of columnar shape is easy in extrusion molding, less in distortion by firing and easy in sealing with casing. In the case of using for microfiltration or ultrafiltration, preferred is a columnar filter having an outer diameter of about 30-180 mmϕ and a length of about 150-2000 mm.

As the shape of cells (shape of section perpendicular to the flow direction of liquid), mention may be made of circular cells as shown in FIG. 1, and besides square cells, hexagonal cells, triangular cells, etc. Among them, the circular cells are suitable because suspended materials deposited on the surface of the partition wall can be easily separated and removed by back washing. In the case of using for microfiltration or ultrafiltration, preferred are circular cells having a diameter of about 1-5 mmϕ.

(ii) Casing:

The term "casing" in this specification means a container which can contain the filter element therein. That is, an inner space is formed in the casing, and the filter element can be contained in the inner space. As mentioned above, pillar-shaped filter elements are generally used, and hence the casing is in many cases constructed in the form of a cylinder capable of containing the pillar-shaped filter element. For example, in the case of using columnar filter element, a cylindrical casing is suitable.

Figure 10:
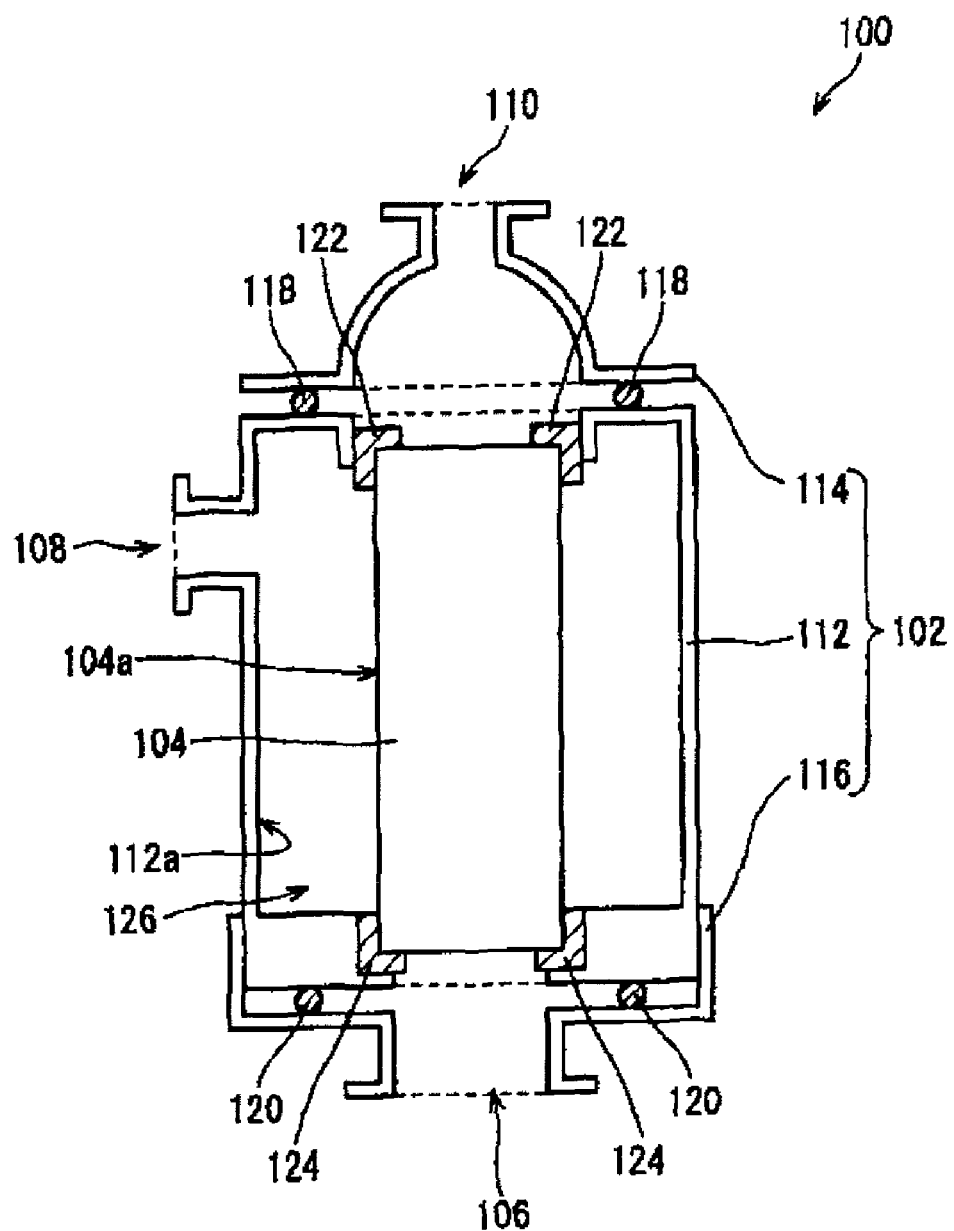
FIG. 10 is a side sectional view which schematically shows one embodiment of the filter.

For example, as shown in FIG. 10, filter 100 is constructed by placing filter element 104 in casing 102 so that the liquid flows in vertical direction. In the case of using, for example, a columnar monolithic filter as filter element, the monolithic filter is contained vertically so that the cells open in vertical direction. In such a filter, filtration is performed when the unfiltered liquid is fed from the lower end side of the filter element and is allowed to flow to upper end side (so-called upward flow filtration).

Furthermore, three kinds of openings of an unfiltered liquid feed opening 106 capable of feeding unfiltered liquid to filter element 104, a filtrate delivery opening 108 capable of delivering the filtrate from filter element 104, and an unfiltered liquid discharging opening 110 capable of discharging the unfiltered liquid from filter element 104 are formed in the casing 102 in such a manner that they communicate with the inner space of the casing. In general, these openings are fitted with flanges to make it easy to connect with piping.

The unfiltered liquid feed opening is an opening for feeding the unfiltered liquid to the filter element and is also utilized for discharging a back washing liquid. This unfiltered liquid feed opening is connected with one opening of the unfiltered liquid feeding header tubes through the flange fitted. In filters which carry out upward filtration, since the unfiltered liquid is fed from the lower end side of the filter element, the unfiltered liquid feed opening 106 is formed in many cases on the lower end side of casing 102 as shown in FIG. 10.

The filtrate delivery opening is an opening for delivering the filtrate from the filter element and is also utilized for feeding clarified water for back washing. This filtrate delivery opening is connected with one opening of the filtrate recovery header tubes through the flange fitted. For making it easy to remove air in the casing, the filtrate delivery opening 108 is formed in many cases on the upper end side of casing 102 as shown in FIG. 10.

The unfiltered liquid discharge opening is an opening for discharging the unfiltered liquid from the filter element, and is also utilized for feeding compressed air for back washing. As the unfiltered liquid, mention may be made of drain waste water in water filling operation, and besides circulation liquid in cross flow operation (a method of continuously carrying out filtration while circulating the unfiltered liquid to filter element), and others.

This unfiltered liquid discharge opening is connected with one opening of the unfiltered liquid recovery header tubes through the flange fitted. In the case of the filter which carries out upward flow filtration, in order to discharge the unfiltered liquid from the upper end side of the filter element, the unfiltered liquid discharge opening 110 is formed generally on the upper end side of casing 102 as shown in FIG. 10.

The casing is not needed to be monolithically constructed, and may comprise some components. For example, like the casing 102 shown in FIG. 10, it may comprise a hollow cylindrical casing body 112, an upper cap 114 fitted at the upper end of the casing body and a bottom cap 116 fitted at the lower end. In this casing 102, there are formed the filtrate delivery opening 108 near the upper end part of the casing body 112, the unfiltered liquid discharge opening 110 at the top of the upper cap 114, and the unfiltered liquid feed opening 106 at the lower end part of the bottom cap 116.

When the casing comprises some components, these are preferably connected using flanges. In this case, it is preferred that sealing materials such as O-rings 118, 120 comprising an elastic material such as rubber or flat packing are allowed to be present between the components to be connected as shown in FIG. 10, and the components are connected in the state of ensuring liquid tightness. For example, there is a method according to which a sealing material is disposed along the flanges of the components to be connected, a bolt hole is provided on the outer peripheral side of the flange provided with the sealing material, and they are fixed by bolt and nut. In this case, a dented groove may be provided for positioning and fixing the sealing material to the flange to make it easy to dispose the sealing material and ensure the fixing.

The casing is preferably composed of a material which is water-impermeable and high in corrosion resistance. In the case of filter element made of resin, the casing is suitably made of resin, and in the case of filter element made of ceramics, the casing is suitably made of stainless steel.

(iii) Filter:

In making a filter, it is necessary that the filter has a structure in which the filter element is contained in the casing in the state of the unfiltered liquid flow paths and the filtrate flow paths being separated liquid tightly. The structure is not particularly limited, but usually employed is a structure in which a sealing material is disposed along the outer edge part of both end faces of the filter element in such a manner that it does not close the cell openings, and the sealing material is allowed to contact with a part of the casing.

The shape, structure, material or the like of this sealing material is not particularly limited, and it may be, for example, an O-ring comprising an elastic material such as rubber or a ring-shaped flat packing. The two functions can be secured by disposing the O-ring or ring-shaped flat packing along outer edge part at the end face of the filter element so that it surrounds all of a plurality of the cell openings.

However, when monolithic filter is used as the filter element, it is preferred to use seal caps 122, 124 as the sealing material as shown in FIG. 10. In this specification, the term "seal cap" means a cap-shaped sealing material used by attaching to the end part of pillar-like body such as filter element (e.g., JP-A-10-184919). Such a cap-shaped sealing material is preferred as compared with O-ring and ring-shaped flat packing in that it can be simply and surely fixed to the filter element and additionally can ensure high liquid-tightness.

Figure 11A:
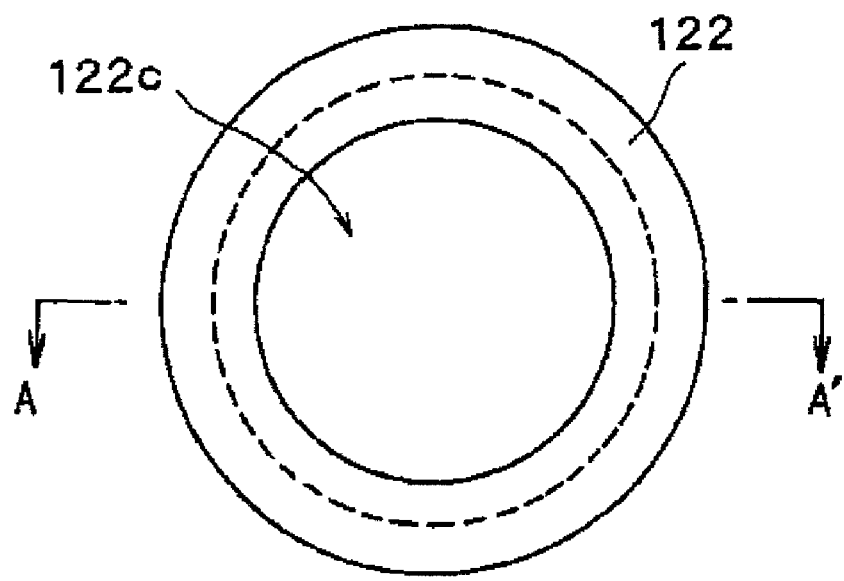
FIG. 11(a) is a top view and FIG. 11(b) is a sectional view taken on line A-A' of FIG. 11(a).
Figure 11B:
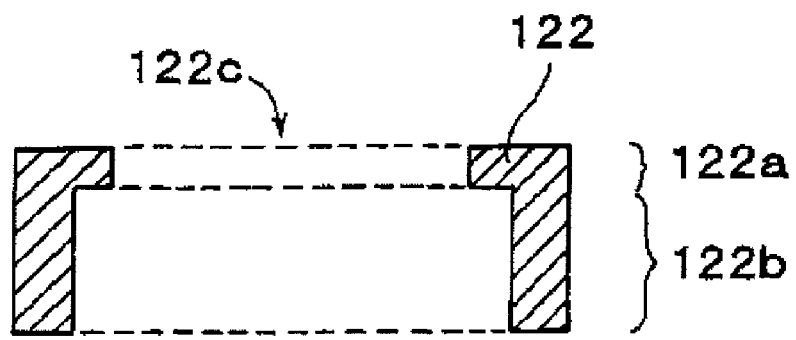

FIG. 11(a) and FIG. 11(b) schematically explain one embodiment of seal cap, and FIG. 11(a) is a top view and FIG. 11(b) is a sectional view taken on line A-A' of FIG. 11(a). The seal cap 122 shown in FIG. 11(a) and FIG. 11(b) is a ring-shaped member made of an elastic material such as rubber and having an L-shaped section, and comprises trunk part 122b extending in vertical direction and top part 122a extending in horizontal direction and has a central opening part 122c.

Figure 12A:
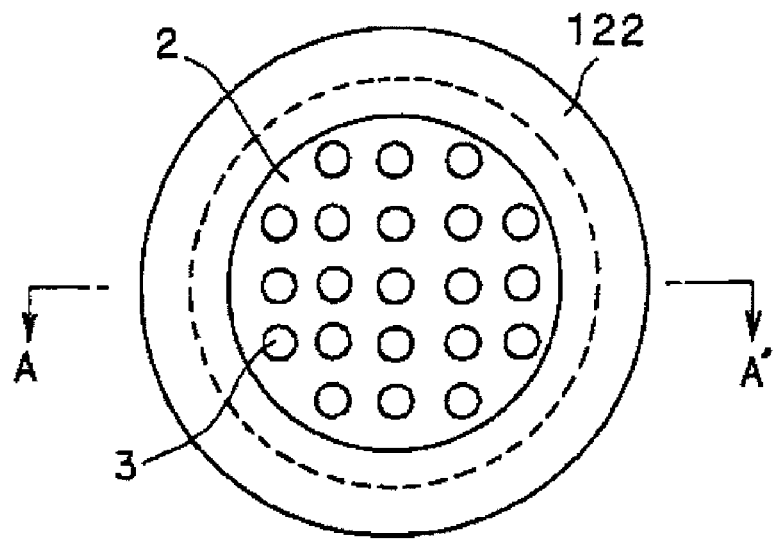
FIG. 12(a) is a top view and FIG. 12(b) is a sectional view taken on line A-A' of FIG. 12(a).
Figure 12B:
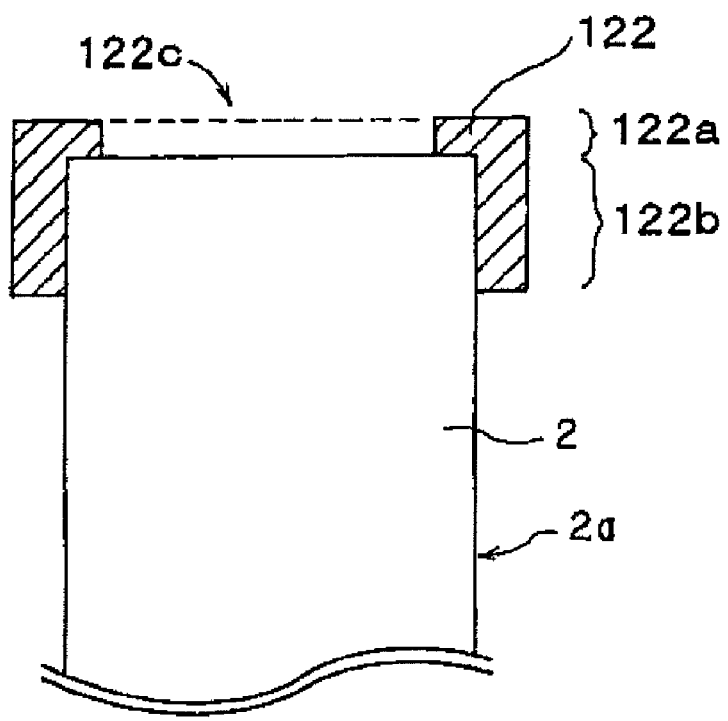

FIG. 12(a) and FIG. 12(b) schematically explain the state of using the seal cap, and FIG. 12(a) is a top view and FIG. 12(b) is a sectional view taken on line A-A' of FIG. 12(a). As shown in FIG. 12(a) and FIG. 12(b), seal cap 122 is used by attaching to the end part of monolithic filter 2 in such a manner that the trunk part 122b closely contacts with outer peripheral surface 2a and the top part 122a closely contacts with the end face of the monolithic filter 2. The central opening part 122c is formed so that all of a large number of the cells 3 of the monolithic filter 2 are exposed, and thus all the cells 3 can be effectively utilized.

In filter 100 shown in FIG. 10, when unfiltered liquid is fed under a given pressure into the cells of filter element 104 from the unfiltered liquid feed opening 106 of bottom cap 116, the unfiltered liquid is filtered at the time of permeating through the partition wall sectioning the cells and flows out into space 126 formed between outer peripheral surface 104a and inner peripheral surface of casing body 112 through the outer peripheral surface 112a of the filter element 104 as a filtrate. This filtrate is stored in the space 126 and finally recovered from filtrate recovery opening 108 of the casing body 112.

Ordinarily, filter 100 is used as a dead end type filter by closing the unfiltered liquid discharge opening 110 at the top of upper cap 114 by a valve or the like. The filter 100 can also be used as a cross-flow type filter by constructing in such a manner that the unfiltered liquid is circulated in the filter 100 by connecting unfiltered liquid discharge opening 110 and unfiltered liquid feed opening 106 by a piping or the like.

(2) Piping:

The filtration device of the present invention has a piping which connects a large number of filters with each other. This piping includes unfiltered liquid feeding header tubes, filtrate recovery header tubes, unfiltered liquid recovery header tubes, and filtrate recovery collecting tubes and/or unfiltered liquid recovery collecting tubes.

The above header tubes and collecting tubes are piping for distributing and feeding the liquid to the filters or other piping or collecting and recovering the liquid from the filters or other piping. The piping comprises a main tube, which has a plurality of openings. A plurality of the openings of the main tube may be provided with branch tubes. In general, the both end openings of the main tube and a plurality of the openings (or openings of branch tubes) are fitted with flanges so that they can be easily connected with the filters or other piping.

(i) Unfiltered Liquid Feeding Header Tube:

The unfiltered liquid feeding header tube is a header tube having a plurality of openings which can be connected with unfiltered liquid feed opening of the casing. This header tube is for distributing and feeding unfiltered liquid sent from unfiltered liquid feeding source to a plurality of filters, and is also utilized for collecting and recovering back washing waste liquid from a plurality of filter elements. A plurality of the openings of the unfiltered liquid feeding header tube are usually connected with unfiltered liquid feed openings of the casing constituting the filter through the fitted flange.

(ii) Filtrate Recovery Header Tube:

The filtrate recovery header tube is a header tube having a plurality of openings which can be connected with filtrate delivery opening of the casing. This header tube is for collecting and recovering the filtrate from a plurality of the filter elements, and is also utilized for distributing and feeding clarified water or liquid chemical for back washing. A plurality of the openings of the filtrate recovery header tube are usually connected with filtrate delivery openings of the casing constituting the filter through the fitted flange.

(iii) Unfiltered Liquid Recovery Header Tube:

The unfiltered liquid recovery header tube is a header tube having a plurality of openings which can be connected with unfiltered liquid discharge opening of the casing. This header tube is for collecting and recovering the drain in water filling operation, and is also utilized for distributing and feeding compressed air for back washing to a plurality of the filter elements. A plurality of the openings of the unfiltered liquid recovery header tube are usually connected with unfiltered liquid discharge openings of the casing constituting the filter through the fitted flange.

(iv) Filtrate Recovery Collecting Tube:

The filtrate recovery collecting tube is a collecting tube having at least two openings which can be connected with the filtrate recovery header tubes. This collecting tube is for collecting and recovering the filtrate from at least two filtrate recovery header tubes, and is also utilized for distributing and feeding clarified water for back washing to at least two filtrate recovery header tubes. At least two openings of the filtrate recovery collecting tube are usually connected with one of the both end openings of the filtrate recovery header tube (main tube) through the fitted flange.

(v) Unfiltered Liquid Recovery Collecting Tube:

The unfiltered liquid recovery collecting tube is a collecting tube having at least two openings which can be connected with the unfiltered liquid recovery header tubes. This collecting tube is for collecting and recovering the drain or the like from at least two unfiltered liquid recovery header tubes, and is also utilized for distributing and feeding compressed air for back washing to at least two unfiltered liquid recovery header tubes. At least two openings of the unfiltered liquid recovery collecting tube are usually connected with one of the both end openings of the unfiltered liquid recovery header tube (main tube) through the fitted flange.

INDUSTRIAL APPLICABILITY

The filtration device of the present invention is used for removing suspended materials or harmful materials such as pathogenic microorganisms in liquid in a wide variety of the fields such as production of potable water or industrial water, fields of medicines and foods, and purification of sewage or industrial waste water. Particularly, it can be suitably used in a large-scale plant such as water purification plant or factory which is required to treat a large amount of unfiltered liquid and to use a large number of the filters which are connected with each other.

The invention claimed is:

1. A filtration device having a large number of filters, each said filter including a filter element comprising a monolithic ceramic porous body having partition walls defining cells as liquid flow paths, and a casing containing said filter element so that the liquid flows in a vertical direction, wherein said casing has an unfiltered liquid feed opening which feeds unfiltered liquid to said filter element, a filtrate discharge opening which discharges filtered liquid from said filter element, and an unfiltered liquid discharge opening which discharges the unfiltered liquid from said filter element;

piping connecting said filters with each other comprising unfiltered liquid feeding header tubes having a plurality of openings connected with said unfiltered liquid feeding opening of said casing, filtrate recovery header tubes having a plurality of openings connected with said filtrate discharge opening of said casing, unfiltered liquid recovery header tubes having a plurality of openings connected with said unfiltered liquid discharge opening of said casing, a filtrate recovery collecting tube having at least two openings connected with said filtrate recovery header tubes, and L-type piping located between said filtrate recovery header tubes and said filtrate recovery collecting tube so that said filtrate recovery collecting tube is located only at a higher position than a position of said filtrate recovery header tubes, wherein said piping further includes an unfiltered liquid recovery collecting tube having at least two openings connected with said unfiltered liquid recovery header tubes, wherein said unfiltered liquid recovery collecting tube is located only at a higher position than a position of said unfiltered liquid recovery header tubes; and filter strings, each comprising a plurality of said filters connected in a row via said unfiltered liquid feeding header tube, said filtrate recovery header tube and the unfiltered liquid recovery header tube, wherein at least two rows of said filter strings are connected in parallel by said filtrate recovery collecting tube, and wherein said filtrate recovery collecting tube is located at a higher position than a position of said filtrate recovery header tubes.

2. A filtration device according to claim 1, wherein said filter element comprises a large number of cells arranged so that flow path directions of the liquid are formed in parallel with respect to one another.

3. A filtration device according to claim 1, wherein at least one of said filtrate recovery collecting tube and said unfiltered liquid recovery collecting tube is provided with a drain valve for removing air.

4. A filtration device having a large number of filters, each said filter including a filter element comprising a monolithic ceramic porous body having partition walls and defining cells as liquid flow paths, and a casing containing said filter element so that the liquid flows in a vertical direction, wherein said casing has an unfiltered liquid feed opening which feeds unfiltered liquid to said filter element, a filtrate discharge opening which discharges filtered liquid from said filter element, and an unfiltered liquid discharge opening which discharges the unfiltered liquid from said filter element;

piping connecting said filters with each other comprising unfiltered liquid feeding header tubes having a plurality of openings connected with said unfiltered liquid feed opening of said casing, filtrate recovery header tubes having a plurality of openings connected with said filtrate discharge opening of said casing, unfiltered liquid recovery header tubes having a plurality of openings connected with said unfiltered liquid discharge opening of said casing, an unfiltered liquid recovery collecting tube having at least two openings connected with said unfiltered liquid recovery header tubes, and L-type piping located between said unfiltered liquid recovery header tubes and said unfiltered liquid recovery collecting tube, so that said unfiltered liquid recovery tube is located only at a higher position than a position of said unfiltered liquid recovery header tube; and filter strings, each comprising a plurality of said filters connected in a row by said unfiltered liquid feeding header tube, said filtrate recovery header tube and said unfiltered liquid recovery header tube, wherein at least two rows of said filter strings are further connected in parallel by said unfiltered liquid recovery collecting tube.

5. A filtration device according to claim 4, wherein the filter element comprises a large number of cells arranged so that flow path directions of the liquid are formed in parallel with respect to one another.

6. A filtration device according to claim 4, wherein said unfiltered liquid recovery collecting tube is provided with a drain valve for removing air.

* * * * *